Figure 1:
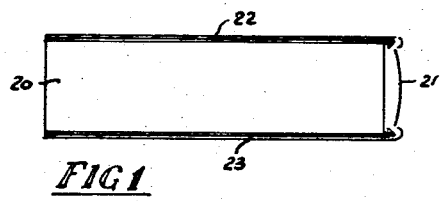

Feb. 27, 1968   H. E. NATALIS   3,370,716
KNOCKDOWN FILING RACK

Filed April 18, 1966   4 Sheets-Sheet 1

INVENTOR.
HERBERT E. NATALIS
BY
ATTORNEY

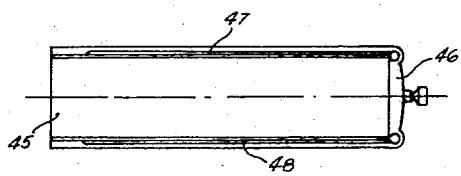
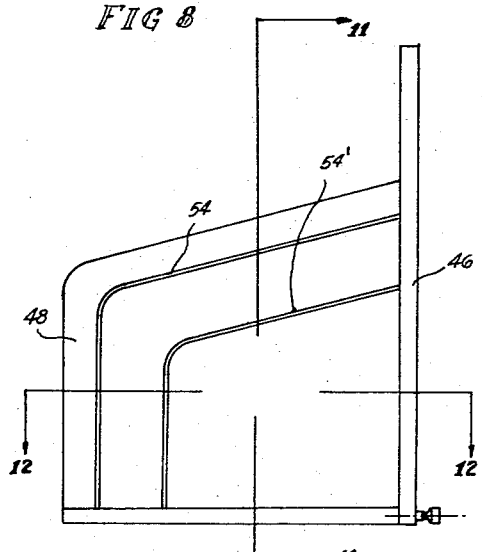
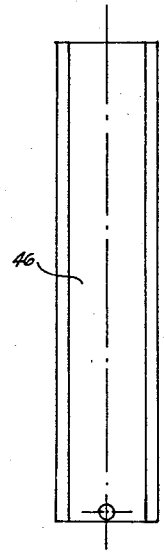
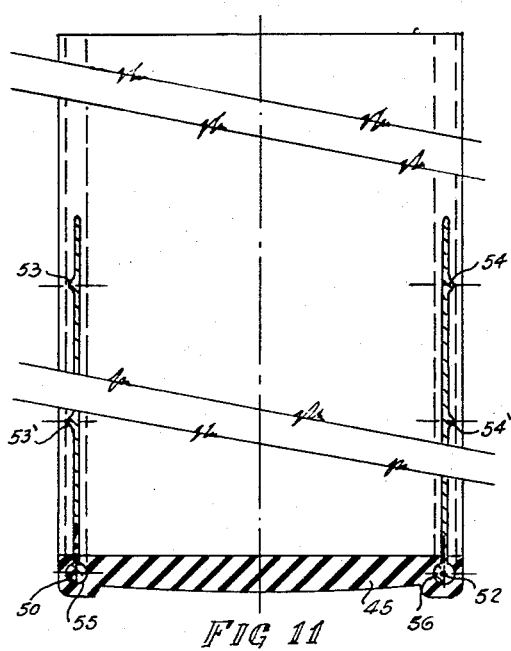
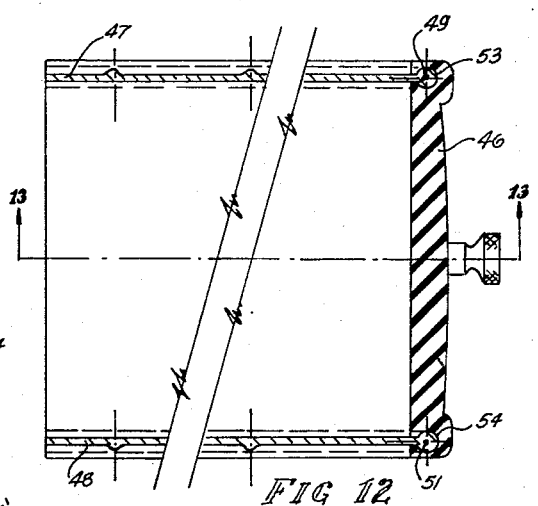
INVENTOR.
HERBERT E. NATALIS Feb. 27, 1968   H. E. NATALIS   3,370,716
KNOCKDOWN FILING RACK Filed April 18, 1966   4 Sheets-Sheet 4

INVENTOR.
HERBERT E. NATALIS
BY
ATTORNEY

United States Patent Office 3,370,716
Patented Feb. 27, 1968

3,370,716
KNOCKDOWN FILING RACK
Herbert E. Natalis, 22 Linda Circle,
Matawan, N.J. 07430
Filed Apr. 18, 1966, Ser. No. 543,417
3 Claims. (Cl. 211—177)

My invention relates to a filing unit or rack for filing and storing various types of items, such as magazines, cards, color slide trays and like articles, and particularly to a unit of the knockdown type which can be easily assembled and disassembled and which is locked together on assembly.

While knockdown storage or filing units are not broadly new, those presently available usually have complicated interlocking structures or lock seam type joints and require extra locking elements to hold the parts together. Usually these units are cumbersome, heavy, and waste shipping space.

Further, because of the complicated lock seam structures and in some cases extra locking elements, costs are increased.

So far as I am aware there are no units of the kind described which although made for example of three standard units, can be transformed into a number of different sizes by interchanging a few parts. Thus different sizes can be provided for any kind of magazine, cards and the like items to be stored.

Furthermore, I am not aware of any structure which can be easily made, for example of extruded material which can be made of any desired length for providing, for example the bottom and the front panels which can be combined with thin flat sides and which can be assembled and automatically locked together by a simple sliding action.

It is the principal object of my invention to provide an improved type of knockdown storage or filing unit comprising a minimum number of simple parts, requiring a minimum space for shipment, which can be quickly and easily assembled and which automatically locks together upon assembly.

A further object of my invention is to provide such a unit which utilizes simple extruded parts which are readily assembled with other parts having simple interlocking structures.

A still further object of my invention is to provide a light weight structure involving a few basic elements which because of interchangeability provide a number of different size assembled storage units.

Briefly, a filing unit made according to my invention comprises an elongated base or bottom element or member and an elongated vertical front element or member made from the same extruded material, preferably of semi-rigid light plastic material. Along each of the elongated sides is a recessed portion providing a shoulder. Extending inwardly from the shoulder is a slot or groove along the entire length of the side. The slot extends inwardly at an angle to the shoulder. A sheet metal side panel is provided for each side. The sheet is provided with a lip or flange along two adjacent side edges, the flanges being at an angle to the panel. The angle matches the angle of the slot angle in the bottom and front members. The side panel flanges are received within the slots or grooves to form an open filing unit at the top and back end. The shoulder or ledge on the plastic bottom and front members allows the side panels to be inserted or withdrawn only in the direction of the groove. The panels cannot slide out sideways because the shoulder retains the flanges in the slots. A flexible tongue is formed on each of the flanges or lips and is received within the slot or grove to lock the unit together. In a modification the side panels may be of molded plastic having beads instead of lips or flanges, which beads are receievd within grooves having cross sections matching the cross sections of the bead.

Figure 6:
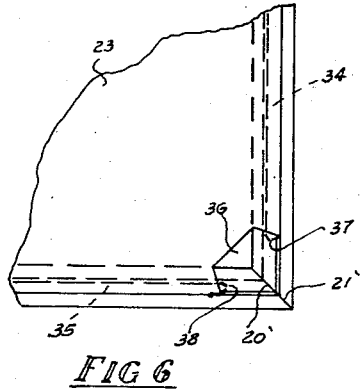
Figure 13:
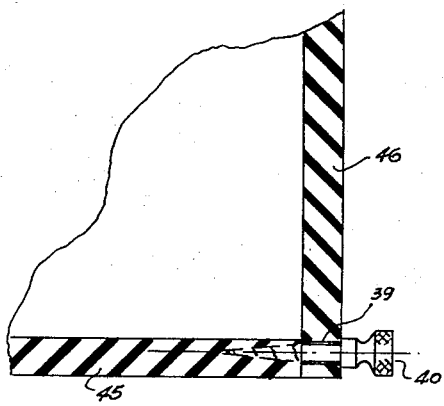
Figure 7:
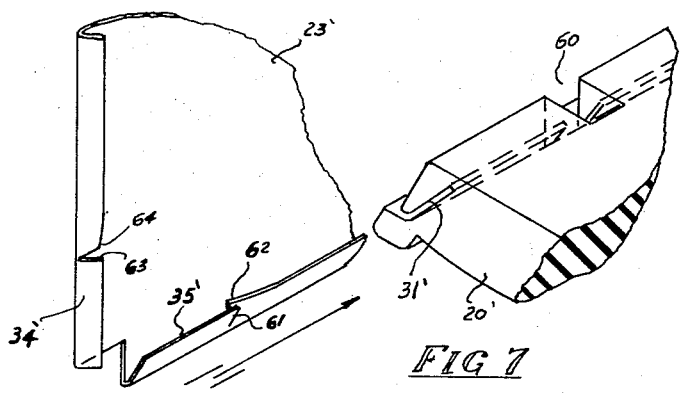
Figure 14:
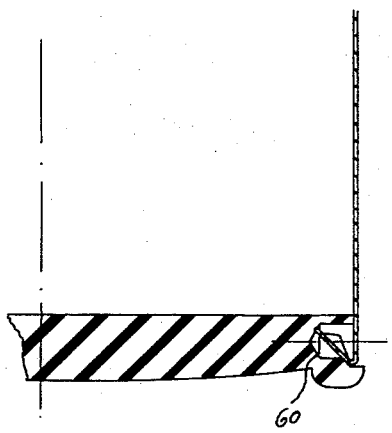
Figure 15:
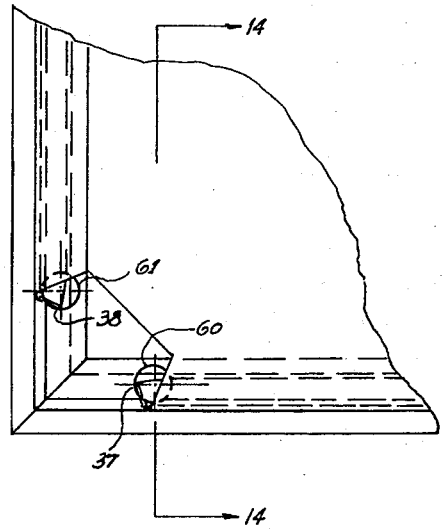

In the drawings:
FIGURE 1 is a top view of a filing or storage unit made according to my invention,
FIGURE 2 is a side elevation of FIGURE 1,
FIGURE 3 is a front elevation of FIGURE 2,
FIGURE 4 is an enlarged section taken along the line 4—4 of FIGURE 2,
FIGURE 5 is an enlarged section taken along the line 5—5 of FIGURE 2,
FIGURE 6 shows a detail of construction of FIGURE 2,
FIGURE 7 is a partial exploded perspective of the structure shown in FIGURES 1 to 3, inclusive, and showing details of construction,
FIGURES 8, 9 and 10 are plan, side elevation and front elevation of a modification of the unit shown in FIGURES 1 to 3, inclusive,
FIGURE 11 is an enlarged section taken along the line 11—11 of FIGURE 9,
FIGURE 12 is an enlarged section taken along the line 12—12 of FIGURE 9,
FIGURE 13 is a partial vertical section taken along the line 13—13 of FIGURE 12,
FIGURE 14 is a partial section showing details of a modification of the locking structure, and
FIGURE 15 is a partial side elevation of FIGURE 14.

Figure 2:
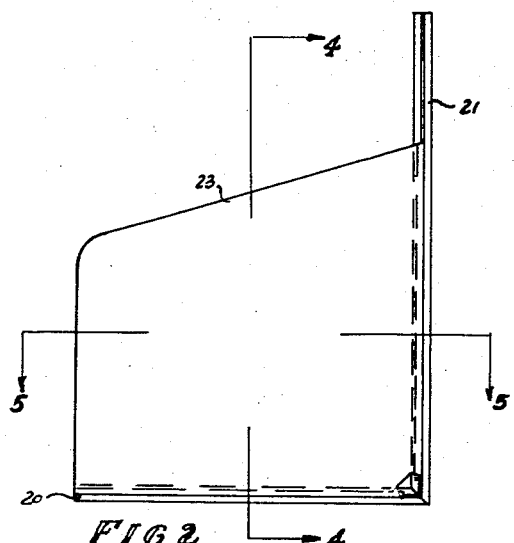
Figure 3:
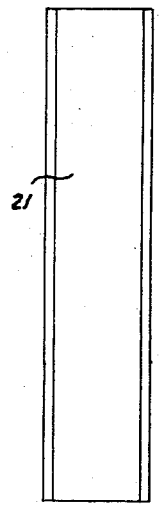

Referring to the drawings, FIGURES 1, 2 and 3, a storage or filing compartment made according to my invention includes a base or bottom member 20, a vertical front member or panel 21, and two side panels 22 and 23, all of which are interlocked on assembly. Members 20 and 21 are preferably made of extruded plastic material which can be cut to predetermined lengths for varying the dimensions of the assembled unit either longitudinally or vertically.

Figure 4:
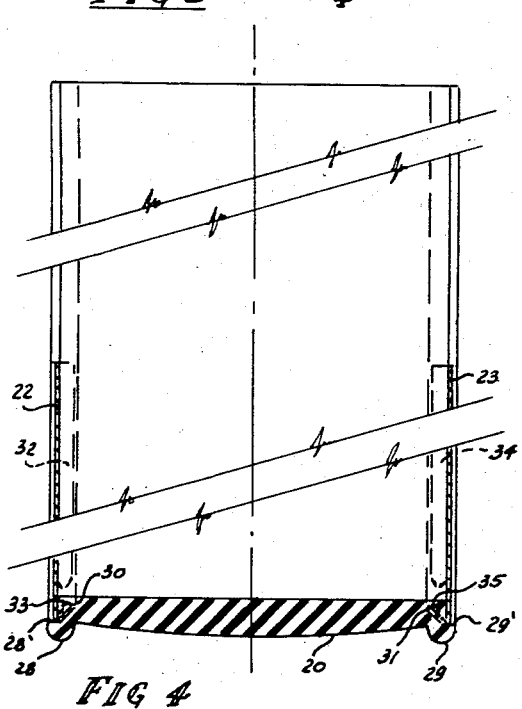
Figure 5:
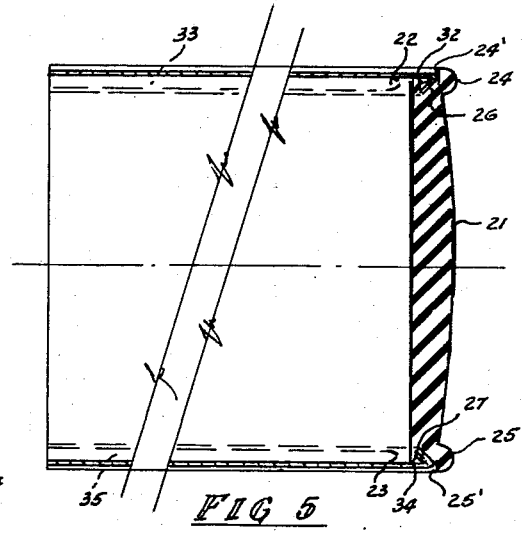

As shown in more detail in FIGURES 4 and 5, the front panel 21 is provided with beads 24 and 25 and is curved outwardly across the front on which identification material may be attached. As shown, the edges are recessed and provide shoulders 24' and 25'. Slots or grooves 26 and 27 are formed in the sides and extend inwardly at an angle from the surfaces of the shoulders 24' and 25' and are at an angle preferably of 45°.

The bottom or base member 20 may have the same cross section as the front panel 21. It is provided with beads 28 and 29 and recessed longitudinally along the sides to provide the shoulders 28' and 29'. Extending at an angle preferably of 45° are the slots or grooves 30 and 31.

The side panel 22 which may be of formed sheet metal or other material is provided with the inwardly extending flanges or lips 32 and 33 at an angle of preferably 45° to the panel 22. The side panel 23 is provided with like flanges 34 and 35.

In assembly the slots 30 and 31 in the bottom member 20 are registered with the flanges 33 and 35. The panels then being pushed into the slots as indicated by the arrow (see FIGURE 7). The panels are pushed forward enough so that when the front panel 21 is pushed downwardly with the slots 26 and 27 registering with the flanges 32 and 34, the tapered edges 20' and 21' (see FIGURE 6) abut each other. In this position the assembly is complete and locked.

To lock the assembly I may provide an aperture or cutout, such as 36 in the front end of each panel. The flanges 34 and 35, for example, may terminate in inwardly directed tongues 37 and 38 bent at an angle to the plane of the panel. These tongues are flexible enough to bend when received within a slot and the ends of these tongues bite into the side of the slot to prevent backward movement of the bottom member 20 and upward movement of the front panel 21, thus locking the parts of the unit together.

In FIGURE 7, I show a modification of the locking arrangement. The panel 23', for example, is provided with the flanges 34' and 35'. Inwardly directed flexible tongues 62 and 64 are provided by slotting at 61 and 63. The bottom panel 20' (as well as the front panel) has a groove or slot such as 31'. The bottom member 20' may have a recess 60 formed thereon communicating with the slot 31'. As the flanges 35' of panel 23' is slid into slot 31', the tongue 62 is flexed inwardly by the side of the slot until the tongue reached the recess 60. At this point tongue 62 snaps outwardly into the recess 60, the edge of the tongue engaging the side wall of recess 60. Thus the panel and bottom member are locked together preventing withdrawal of the panel. It is understood that the tongue 64, for example, is similarly locked within the slot in the front member in like manner.

I show a modification of the rack shown in the previous figures in FIGURES 8 to 13, inclusive. In this modification all members are made of either extruded plastic material or molded material.

As shown in FIGURES 8, 9 and 10, the bottom member 45 and front panel 46 are of the same cross section extruded material of any desired length. The side panels 47 and 48 are molded panels which may be provided with reinforcing ribs 53, 53', 54 and 54'. In this modification the front panel extends to the bottom of the unit and the whole unit secured together with a screw 40 which extends through an aperture 39 in panel 46 and threaded into the bottom member 45.

The panels 47 and 48 are provided with the beaded edges 49, 50 and 51, 52, respectively. In assembly the beads 50 and 52 are first inserted in slots 55 and 56 of the bottom member 45 and moved into position to register the beads 49 and 51 with slots 53 and 54. The front panel is then moved downwardly until its bottom edge is in proper registry with the bottom member. After this the screw is inserted to lock the unit together.

In FIGURES 14 and 15 I show a still further modification of the locking structure. In this arrangement the locking elements can be engaged to release the various elements or members so that the unit may be disassembled.

In this modification the bottom member and front panel have a recess 60 and 61 formed therein. The tips of the tongues 37 and 38 enter the slots or grooves under tension and snap into the recesses, locking all parts together. However to disassemble, the tips can be depressed inwardly out of the recesses into the groove so that the bottom and front panel members can be separated from the panel.

What is claimed is:

1. A knockdown storage unit comprising an elongated bottom member and a front panel member of extruded material, said bottom member and said front panel member having the same transverse cross section, the elongated side edges of said members having a recessed portion extending to one surface and providing a shoulder, said members having slots extending at an angle from said shoulders and opening up on said shoulders, said bottom member and said front panel member having abutting ends at an angle to each other, side panel members of sheet metal forming the sides of said unit, two adjacent edges of said side panels having inturned flanges engaged in said slots, said flanges having the same angles as said slots with respect to said shoulders, the flanged ends of said panels engaging said shoulders, said flanges terminating short of each other at their adjacent ends, said flanges terminating in tongues at an angle to the plane of said flanges and having tips thereon, recesses in the walls of said slots, said tips being received within said recesses and providing an interlocking engagement with said bottom member and said front panel, said side panels being provided with a recess registering with the tips of said tongues whereby said tongues may be disengaged from said apertures to permit said panels to be released from said bottom member and said front panel.

2. A knockdown storage unit comprising an elongated bottom member and a front panel member of extruded material, said bottom member and said front panel member having the same transverse cross section, the elongated side edges of said members having a recessed portion extending from one surface and providing a shoulder, said members having slots extending at an angle from each of said shoulders and opening up on said shoulders, said bottom member and said front panel member having abutting ends, side panel members of sheet material forming the sides of said unit, two adjacent edges of said side panels having inturned flanges engaged in said slots, the flanged edges of said panels engaging said shoulders, said flanges terminating short of each other at their adjacent ends.

3. A knockdown storage rack comprising an elongated bottom member and a front panel member of extruded material, said bottom member and said front panel having the same transverse cross section, the elongated side edges of each said members having a recessed portion extending to one surface and providing a shoulder, said members having slots extending at an angle to said shoulders and opening up on said shoulders, said bottom member and said front panel having abutting ends, panel members of sheet material forming the sides of said rack, two adjacent edges of said side panel members having inturned flanges engaged in said slots, the edges of said side panels having said flanges engaging said shoulders, said flanges terminating short of each other at their adjacent ends, said adjacent ends terminating in tongues at an angle to the plane of said flanges for frictionally engaging the wall of said slots for providing an interlocking engagement with said bottom member and said front panel member.

References Cited

UNITED STATES PATENTS

| | | | |
|---|---|---|---|
| 2,615,589 | 10/1952 | Perdue | 217—12 |
| 2,729,386 | 1/1956 | Haddad | 217—12 XR |
| 3,268,284 | 8/1966 | Branciforte | 312—263 |

ROY D. FRAZIER, *Primary Examiner.*

W. D. LOULAN, *Assistant Examiner.*